(12) United States Patent
Yasunori et al.

(10) Patent No.: US 7,605,711 B2
(45) Date of Patent: Oct. 20, 2009

(54) COMMUNICATION ANOMALY DETECTING DEVICE, AND PASSENGER DETECTING DEVICE

(75) Inventors: Hiromichi Yasunori, Nagoya (JP); Masaki Mori, Kariya (JP); Morio Sakai, Toyota (JP); Chiaki Sumi, Chita-gun (JP); Isao Hagiwara, Nagoya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 417 days.

(21) Appl. No.: 11/628,235

(22) PCT Filed: Jul. 27, 2005

(86) PCT No.: PCT/JP2005/013712
§ 371 (c)(1),
(2), (4) Date: Dec. 1, 2006

(87) PCT Pub. No.: WO2006/011500
PCT Pub. Date: Feb. 2, 2006

(65) Prior Publication Data
US 2008/0061989 A1 Mar. 13, 2008

(30) Foreign Application Priority Data
Jul. 28, 2004 (JP) ............... 2004-220883
Jul. 28, 2004 (JP) ............... 2004-220884
Jul. 28, 2004 (JP) ............... 2004-220888

(51) Int. Cl.
*G08B 23/00* (2006.01)
*G08B 21/00* (2006.01)
(52) U.S. Cl. ............... 340/650; 340/573.1; 340/667
(58) Field of Classification Search ............... 340/650, 340/573.1, 667
See application file for complete search history.

(56) References Cited

U.S. PATENT DOCUMENTS
5,474,327 A * 12/1995 Schousek ............... 280/735

(Continued)

FOREIGN PATENT DOCUMENTS
JP 5-107292 A 4/1993

(Continued)

OTHER PUBLICATIONS
English language version of International Preliminary Report on Patentability dated Jan. 30, 2007.

(Continued)

*Primary Examiner*—Daniel Wu
*Assistant Examiner*—John F Mortell
(74) *Attorney, Agent, or Firm*—Buchanan Ingersoll & Rooney PC

(57) ABSTRACT

An information request portion receives an information request signal transmitted to an information response portion at its own receiving port. The information request portion comprises at least either of a power supply system anomaly determination portion or a ground anomaly determination portion. The power supply system anomaly determination portion determines a short-circuit between a signal line and a power supply system in a case where the information request signal received at the receiving port is always fixed to a H (high) level. The ground anomaly determination portion determines a short-circuit between a signal line and a ground in a case where the information request signal received at the receiving port is always fixed to a L (Low) level. Consequently, the anomaly region of the signal line connecting the information request portion and the information response portion in such a manner that bidirectional digital communications are possible or the cause of the anomaly is specified.

2 Claims, 8 Drawing Sheets

U.S. PATENT DOCUMENTS

| | | |
|---|---|---|
| 6,746,043 B2 | 6/2004 | Ishida |
| 7,046,013 B2 | 5/2006 | Uematsu et al. |
| 7,265,955 B2 | 9/2007 | Fink |
| 2002/0010772 A1 | 1/2002 | Kusano |
| 2003/0067149 A1* | 4/2003 | Gray et al. .................. 280/735 |
| 2004/0016577 A1* | 1/2004 | Lichtinger et al. .......... 177/144 |
| 2004/0068357 A1 | 4/2004 | Kiribayashi |
| 2004/0135697 A1 | 7/2004 | Sakai et al. |
| 2005/0043876 A1* | 2/2005 | Fultz et al. .................... 701/45 |

FOREIGN PATENT DOCUMENTS

| | | |
|---|---|---|
| JP | 7-170295 A | 7/1995 |
| JP | 08-146069 A | 6/1996 |
| JP | 2002-044129 A | 2/2002 |
| JP | 2002-188855 A | 7/2002 |
| JP | 2003-002255 A | 1/2003 |
| JP | 2003-304633 A | 10/2003 |
| JP | 2004-053459 A | 2/2004 |
| JP | 2004-122927 A | 4/2004 |
| JP | 2006-515979 A | 6/2006 |

OTHER PUBLICATIONS

International Search Report dated Nov. 1, 2005.

* cited by examiner

COMMUNICATION ANOMALY DETECTING DEVICE, AND PASSENGER DETECTING DEVICE

FIELD OF THE INVENTION

The present invention relates to a communication anomaly detector and occupant detector.

BACKGROUND OF THE INVENTION

Heretofore, in various devices, for example, as a method of transmitting information signal from a sensor to an electronic control unit (hereinafter referred to as ECU), an analogue communication system and a digital communication system have been in popular use. For example, in the analogue communication system, to detect communication anomaly of signal lines and the like, it is possible to set a detection threshold value for an abnormal voltage by using an analogue voltage as an information signal. On the other hand, in the digital communication system, it is possible to detect the communication anomaly by checking a parity data included in the information signal (digital signal).

In the detection of the communication anomaly by the digital communication system described above, at the time of communication anomaly, an anomaly region (failed region) or a cause of the anomaly cannot be specified.

Further, there is known a communication device, in which a sensor and an ECU are connected through communication lines in such a manner that bidirectional digital communications are possible (for example, Patent Document 1). Adopting such a communication system, for example, to an occupant detector for determining an occupant sitting in a seat of a vehicle such as an automobile has been proposed.

That is, the occupant detector comprises a plurality of load sensors for acquiring load information according to a load applied to a seat and the ECU connected to these load sensors through each signal line in such a manner that bidirectional digital communications are possible. When the ECU transmits an information request signal to a plurality of load sensors, respectively, these load sensors receive the information request signals. The load sensors transmit the load information signal including the load information in response to the received information request signal. The ECU receives the load information signals and performs an occupant determination.

The ECU comprising such an occupant detector transmits the information request signals in order to these load sensors from the same number of plural transmission ports as the plural load sensors. Consequently, it is often the case that a time lag is caused to the timing in which the ECU transmits the information request signal to each load sensor. Hence, synchronicity of the load information included in the load information signals transmitted from these load sensors is often impaired. That is, each load sensor transmits the load information signal including the load information acquired by mutually different timing. On the other hand, a posture of the occupant sitting in a seat is constantly changing, and the load information acquired by these load sensors is also constantly changing. Consequently, in a case where the ECU receives the load information signals including these pieces of the load information impaired in synchronicity and performs the occupant determination based on such received load information signals, accuracy of the occupant detection is often lowered.

Further, heretofore, with respect to disconnection detection adoptable to the occupant detector for performing an occupant determination by detecting a load applied to the seat of the vehicle such as an automobile and the like, there is known, for example, the detector disclosed in Patent Document 2. As shown in FIG. 9, in a normal operating status of this detector, an output transistor Q increases and decrease the current flowing between a collector and an emitter according to the detection voltage of a sensor 210 applied to a base. Accompanying this, a voltage drop generated at a resistor R201 and a resistor R202 changes, and a voltage EOUT of a signal output terminal 213 increases and decreases. Hence, the voltage drop generated at a resistor R204 of a converter 220 connected to the signal output terminal 213 changes. Based on this voltage drop generated at the resistor R204 according to the detection voltage of the sensor 210, the status of a monitoring object is detected.

In such constitution, when a lead wire (wire harness 230) between a power supply terminal 212 of the sensor 210 and a power supply terminal 222 of the converter 220 is disconnected (opened), the emitter of the output transistor Q is opened from a ground GND and is put into an OFF state. For example, by making the voltage drop generated in the resistor R204 higher than the maximum value of the voltage generatable in a normal operating state, the securing of a clamp voltage (for example, 4.4V or more) of a H level in an OFF state of the output transistor in order to detect disconnection is considered. For this purpose, the voltage of the signal output terminal 213 of the sensor 210 is required to be set high in advance.

The voltage of the signal output terminal 213 in an off state of the output transistor Q is determined by a combined resistance of resistors R203 and R204 and a partial pressure ratio with the resistor R201. Consequently, opening (disconnection) between the power supply terminals 212 and 222 is detectable by setting the resistor R204 sufficiently larger (for example, 100 kΩ or more) than the resistor R201.

In a case where such a constitution is adopted, for example, in a case where the power supply voltage E is 5V, the output current from the signal output terminal 213 to a signal input terminal 223 becomes small, which is below 0.05 mA (≈5V/100 kΩ). In a case where the signal output terminal 213 and signal input terminal 223 are general purpose terminals tin-plated with copper, the current flow becomes little, and therefore, it becomes difficult for the current to crush an oxide film formed in the signal output terminal 213 and the signal input terminal 223. Alternatively, there arises a need to treat the signal output terminal 213 and the signal input terminal 223 with a gold plating as a counter measure against the oxide film, so that there is no choice but to increase the number of manufacturing man-hours and manufacturing cost.

Further, since the resistance value of the resistor R204 is high, a signal system line (between the signal output terminal 213 and the signal input terminal 223) becomes high in impedance, and therefore, being easily affected by peripheral noises and the like, the output current from the signal output terminal 213 of the sensor 210 to the signal input terminal 223 of the converter 220 often changes.

Patent Document 1: Japanese Patent Laid-Open No. 2002-188855

Patent Document 2: Japanese Patent Application Laid-Open No. 5-107292

SUMMARY OF THE INVENTION

An object of the present invention is to provide a communication anomaly detector capable of specifying an anomaly region of the signal line connecting an information request portion and an information response portion in such a manner that bidirectional digital communications are possible or a cause of the anomaly.

Further, an object of the present invention is to provide an occupant detector capable of improving detection accuracy of an occupant determination by guaranteeing synchronicity of each piece of the load information included in a plurality of load information signals transmitted from a plurality of load sensors.

Further, an object of the present invention is to provide an occupant detector capable of detecting disconnection between the control device and the load sensor without increasing the impedance of the signal system line higher than before.

To achieve the above described objects, the present invention provides a communication anomaly detector of the communication system, comprising an information request portion having a receiving port and at least one information response portion connected to this information request portion through a signal line in such a manner that bidirectional digital communications are possible. When the information request portion transmits an information request signal, the information response portion receives the information request signal and transmits an information response signal to a receiving port of the information response portion. The information request portion receives the information request signal transmitted to the information response portion at the receiving port. The information request portion comprises at least one of a power source system anomaly determination portion and a ground anomaly determination portion. The power source system anomaly determination portion determines a short-circuit between the signal line and the power source system in a case where the information request signal received at the receiving port is always fixed to a H (high) level. The ground anomaly determination portion determines a short-circuit between the signal line and the ground in a case where the information request signal received at the receiving port is always fixed to a L (low) level.

Further, the present invention provides an occupant detector comprising a plurality of load sensors acquiring load information according to a load applied to a seat and a control device connected to a plurality of load sensors in such a manner that bidirectional digital communications are possible through the signal line, respectively. When the control device transmits information request signals to the plurality of load sensors, the plurality of load sensors receive the information request signals, and by responding to the received information request signals, transmits the load information signals including the load information. The control device receives this load information signal and performs an occupant determination. The control device comprises a single transmission port for transmitting the information request signals to the plurality of load sensors and a plurality of receiving ports for receiving each piece of the load information signals from the plurality of load sensors. The number of the receiving ports is the same as the number of the load sensors.

Further, the present invention provides an occupant detector comprising at least one load sensor for acquiring load information according to a load applied to a seat and a control device connected to the load sensor in such a manner that bidirectional digital communications are possible through a signal system line. When the control device transmits the information request signal to the load sensor, the load sensor receives the information request signal, and by responding to the received information request signal, transmits a load information signal including the load information. The control device receives this load information signal and performs an occupant determination. The occupant detector comprises the control device and first and second power supply system lines for supplying electricity to the load sensor through the control device. A potential of the first power supply system line is higher than the potential of the second power supply system line. The control device comprises a switching element and a pull-up resistor. The switching element comprises a first terminal connected to the signal system line, a second terminal connected to the second power supply system line, and a control terminal for inputting the information request signal. The pull-up resistor comprises one end connected to the first power supply system line and another end connected to the signal system line. The load sensor comprises a sensor side switching element comprising a first sensor side terminal connected to the signal system line, a second sensor side terminal connected to the second power supply system line, and a sensor side control terminal for inputting the load information signal.

DETAILED DESCRIPTION OF THE PREFERRED EMBODIMENTS

One embodiment of the present invention will be described below with reference to the drawings.

Figure 1:
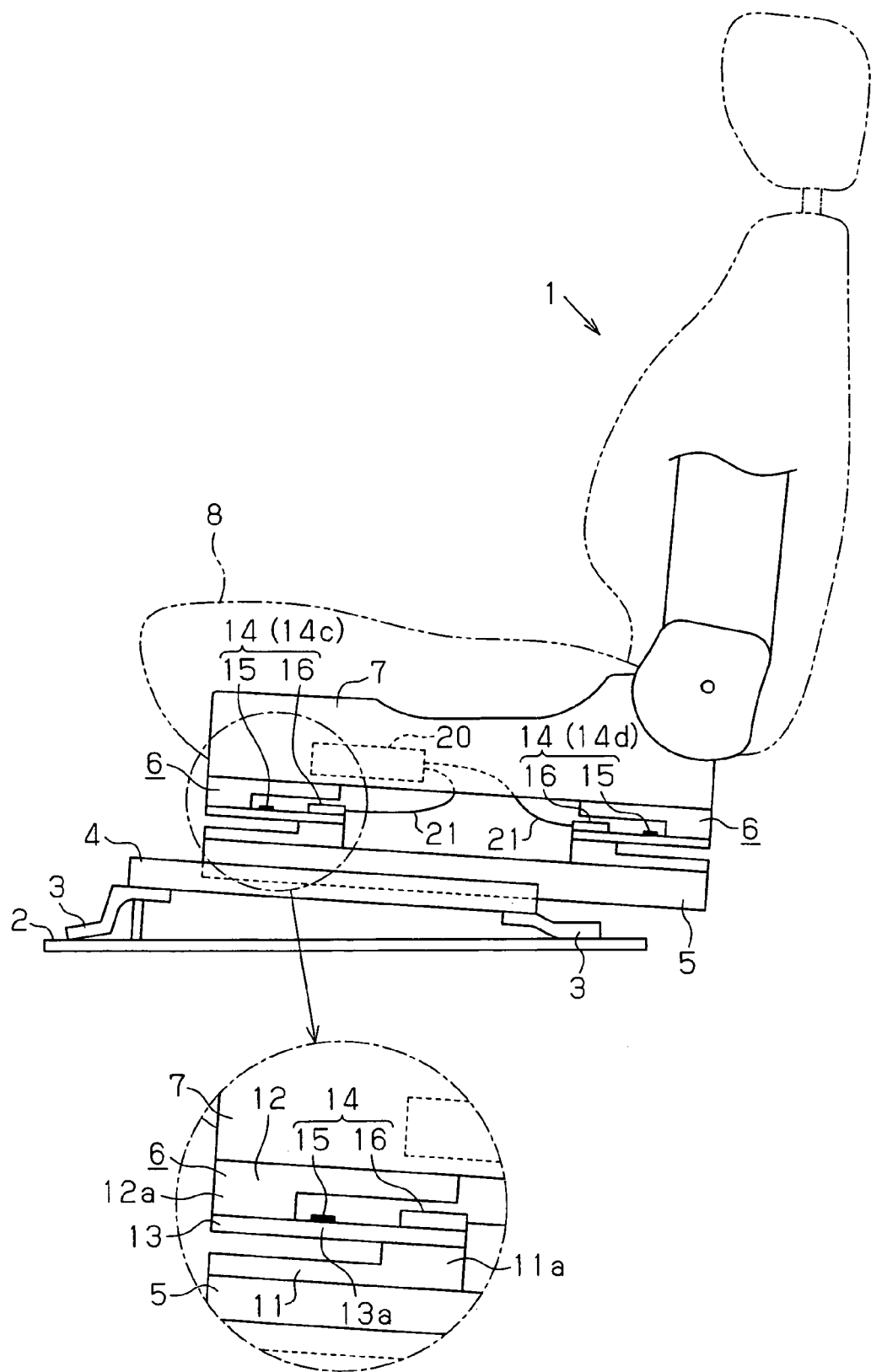
FIG. 1 is a side view showing a framework of a seat to which an occupant detector according to one embodiment of the present invention is applied.

FIG. 1 is, for example, a side view showing a framework portion of a seat 1 mounted on a front passenger driver seat of a vehicle such as an automobile. The framework portion shown in FIG. 1 is installed by making a pair in the width direction (direction orthogonal to the sheet of FIG. 1) of the seat 1. FIG. 1 shows a side view of the framework portion installed to the left heading for the front of the vehicle seen from the outside of the seat. A framework portion installed to the right heading for the front of the vehicle has the same shape, and therefore, on behalf of the left side framework portion, the description will be made as follow.

As shown in FIG. 1, this seat 1 comprises a support frame 2 fixed to an unillustrated vehicle floor so as to extend in a fore-and-aft direction. The upper surface of this support frame 2 is fixed with a pair of front and back brackets 3. The pair of front and back brackets 3 is fixed with a lower rail 4 which extends along the support frame 2. Above the lower rail 4, an upper rail 5 is installed slidably in a fore-and-aft direction.

On the upper surface of the upper rail 5, a lower arm 7 is supported through a pair of front and back sensor units 6. The sensor unit 6 secures a predetermined interval between the upper rail 5 and the lower arm 7. This lower arm 7 makes a framework of a seat cushion 8. In the present embodiment, a total of four pieces of the sensor units 6 are installed. The sensor unit 6 makes a pair in front and back of the lower arm 7, and exists left and right in the seat 1.

As enlarged in FIG. 1, each sensor unit 6 comprises a first bracket 11 and second bracket 12, a strain generating member 13, and a load sensor 14. The load sensor 14 functioning as an information response portion comprises a strain gage 15 and a signal processor 16. The first bracket 11 is fixed on the upper surface of the top end (front end) of the upper rail 5. The rear end of the first bracket 11 is formed with a support portion 11a protruding upward. The support portion 11a has a flat upper surface. On the other hand, the second bracket 12 is fixed to the bottom of the top end (front end) of the lower arm 7. The top end (front end) of the second bracket 12 is formed with a support portion 12a protruding downward. The support portion 12a has a flat bottom. These first and second brackets 11 and 12 are vertically opposed so that the support portions 11a and 12a alternately protrude.

The first and second brackets 11 and 12 extend such that the fore-and-aft direction of the vehicle becomes a longitudinal direction. The strain generating member 13 is formed in the shape of a plate extending along the longitudinal direction of the first and second brackets 11 and 12. The rear end of the strain generating member 13 is fixed to the support portion 11a, and the front end of the strain generating member 13 is fixed to the support portion 12a. Consequently, the strain generating member 13 has the end portion (rear end) close to the support portion 11a functioning as a fixed end and functioning as a cantilever for receiving a load applied on the lower arm 7 (seat 1) from the end portion (front end, free end) close to the support portion 12a. An intermediate portion of the strain generating member 13 functions as a bending portion 13a. The strain gage 15 of the load sensor 14 is adhered on the upper surface of this bending portion 13a. The signal processor 16 is mounted on the upper surface of the rear end of the strain generating member 13 supported by the support portion 11a. The strain generating member 13, when applied with a load in a vertical direction from the second bracket 12 (support portion 12a), is bent with the end portion (rear end) close to the support portion 11a as a point of support. The strain gage 15 generates a gage voltage according to a strain amount accompanying the bending of this strain generating member 13 (bending portion 13a). This gage voltage basically linearly fluctuates according to the load applied to the seat. The signal processor 16 is connected to the strain gage 15. The signal processor 16, based on the gage voltage, performs the acquisition and the like of the load information according to a load applied to the seat 1. That is, the signal processor 16 mix-loads various analogue circuits and digital circuits and the like, and A/D converts (analogue/digital) the gage voltage described above which is the analogue signal, and writes the signal after the conversion in the memory as the load information, thereby storing it in the memory. Consequently, the memory of the signal processor 16 is renewed and stored with the most recent load information in timing with the acquisition of the load information.

The lower arm 7 supports an ECU 20 functioning as an information request portion and a control device. This ECU 20 is connected to the four load sensors 14 (signal processor 16) provided in all the sensor units 6 (four pieces) in such a manner that bidirectional digital communications are possible through the signal lines 21 respectively. The ECU 20 receives the load information signals as the information response signals including the load information acquired by these load sensors 14, and performs an occupant determination. In the following, for convenience sake, the load sensors 14 installed at right front and right rear of the seat 1 are described as load sensors 14a and 14b, respectively, and the load sensors 14 installed at left front and left rear are described as load sensors 14c and 14d. However, when matters common to these load sensors 14a to 14d are described, they are described just as the load sensor 14 on behalf of each load sensor.

Next, the electrical constitution of the ECU 20 in the present embodiment will be described with reference to the block diagram of FIG. 2.

Figure 2:
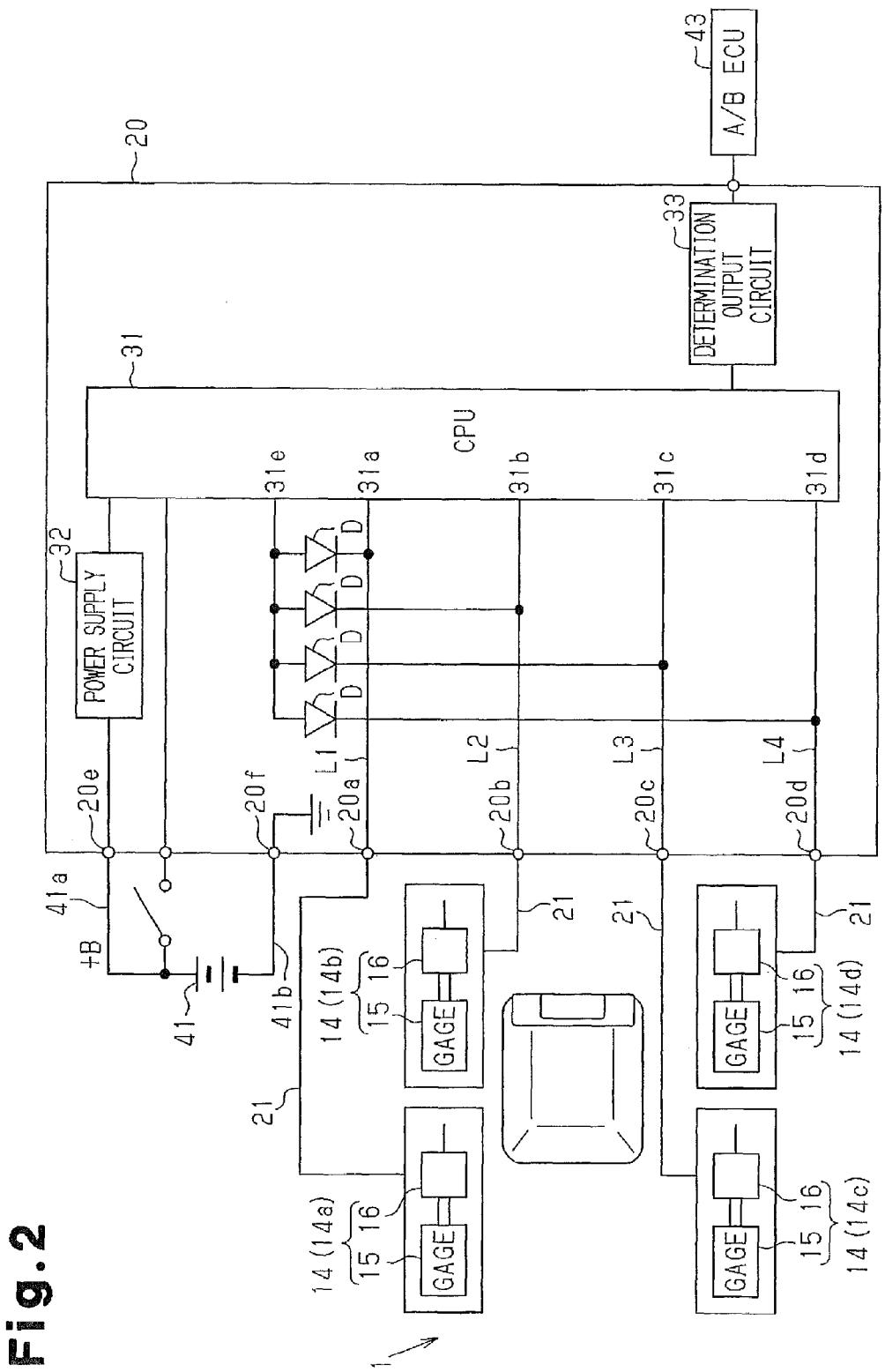
FIG. 2 is a block diagram showing an electrical structure of an ECU provided for the occupant detector of FIG. 1.

As shown in FIG. 2, the ECU 20 comprises a central processing unit (hereinafter referred to as CPU) 31, a power supply circuit 32, and a determination output circuit 33. The CPU 31 communicates with an airbag ECU 43 through the determination output circuit 33 as discussed in further detail below. Further, the ECU 20 integrally comprises a ROM storing various programs, maps, and the like, a RAM (Random Access Memory) capable of reading and writing various data and the like, and for example, a rewritable non-volatile memory and the like comprised of EEPROM (Electrically Erasable Programmable ROM). The CPU 31 (ECU 20) is individually connected to all the load sensors 14a to 14d (signal processors 16) through a total of four pieces of the signal lines 21, respectively.

To describe more in details, the ECU 20 comprises a first terminal 20a, a second terminal 20b, a third terminal 20c, and a fourth terminal 20d. The load sensors 14a to 14d are connected to the first to fourth terminals 20a to 20d through the signal lines 21, respectively.

Further, the CPU 31 comprises a plurality (four pieces) of receiving ports (first receiving port 31a, second receiving port 31b, third receiving port 31c and fourth receiving port 31d), and one transmission port 31e. Inside the ECU 20, the first terminal 20a is connected to the first receiving port 31a through an inner wiring L1, the second terminal 20b to the second receiving port 31b through an inner wiring L2, the third terminal 20c to the third receiving port 31c through an inner wiring L3, and the fourth terminal 20d to the fourth receiving port 31d through an inner wiring L4, respectively. Further, the transmission port 31e is connected to the inner wirings L1 to L4 through a total of four individual diodes D for reversed flow prevention, respectively. These diodes D permit the signals from the transmission port 31e to be transmitted to the inner wirings L1 to L4 and the signal lines 21, and at the same time, prevent the signals from the signal lines 21 and the inner wirings L1 to L4 from being transmitted to the transmission port 31e. Consequently, the CPU 31 of the present embodiment can receive the signal transmitted from the transmission port 31e at the first to fourth receiving ports 31a to 31d of the CPU 31 itself through the diodes D and the inner wirings L1 to L4. That is, the CPU 31 of the present embodiment, during the period of transmitting the information request signals from the transmission port 31e, receives by itself this transmitted information request signals at the first to fourth receiving ports 31a to 31d. Further, the CPU 31 responds to the information request signals and receives the load information signals transmitted from each of the first to fourth load sensors 14*a* to 14*d* at the first to fourth receiving ports 31*a* to 31*d*. The first to fourth receiving ports 31*a* to 31*d* are provided with a pull-up resistor (see resistor R23 of FIG. 8), respectively. Consequently, these first to fourth receiving ports 31*a* to 31*d* set the load information signals and the like from each of the load sensors 14*a* to 14*d* to the H level during a period of waiting at the reception.

The ECU 20 comprises a power supply terminal 20*e* and a ground terminal 20*f*. A positive electrode of a vehicle battery 41 mounted in the vehicle is connected to the power supply terminal 20*e* through a power supply line 41*a*. The CPU 31 is connected to the power supply terminal 20*e* through the power supply circuit 32. The power supply circuit 32 generates a power supply voltage of a predetermined level Vcc (for example, 5V), and supplies it to the CPU 31. Further, a negative electrode of the vehicle battery 41 is connected to the ground terminal 20*f* through a ground line 41*b*.

In the above described constitution, when the CPU 31 transmits the information request signals from the transmission port 31*e* at the occupant determination, these information request signals are received simultaneously at the signal processors 16 of the load sensors 14*a* to 14*d* through the diode D, the inner wirings L1 to L4 and the signal lines 21 respectively. It is already mentioned that, at this time, the CPU 31 receives the information request signals at the first to fourth receiving ports 31*a* to 31*d*, respectively. Consequently, signal waveforms received at this time of the first to fourth receiving ports 31*a* to 31*d* are the same as the waveforms of the information request signals described above.

Each of the signal processors 16, upon reception of the information request signal from the CPU 31, reads the load information stored in its own memory of the signal processor 16, and generates a load information signal in which this read load information is processed according to a predetermined transmission format, and transmits this generated load information signal to the ECU 20. That is, all the signal processors 16, upon simultaneous reception of the information request signals from the CPU 31, simultaneously transmit the load information signals including the most recent load information stored in own memories of the signal processors 16. The first to fourth receiving ports 31*a* to 31*d* of the CPU 31 receive each of the load information signals. Consequently, the signal waveforms of the first to fourth receiving ports 31*a* to 31*d* received at this time are the same as the waveforms of the load information signals transmitted by respective corresponding load sensors 14*a* to 14*d*. In the present embodiment, the signal waveform at this time is set so as not to be fixed at the same level (H or L) as long as it is normally operated because of the communication protocol to be applied.

A relationship between the information request signals accompanying the occurrence of various communication anomalies and the signals received at the first to fourth receiving ports 31*a* to 31*d* will be described on the basis of the time chart of FIG. 3. Since the relationship between the communications anomalies related to the load sensors 14*a* to 14*d* and the corresponding signals at the first to fourth receiving ports 31*a* to 31*d* is the same, a description will be made below on the behalf of the load sensor 14*a* and the first receiving port 31*a*. Further, in the present embodiment, because of the communication protocol to be applied, the transmission of the information request signal and reception (waiting for the reception) of the load information signal corresponding to this transmission are repeated for a predetermined number of N times until the communication anomaly is finally determined. That is, for the final decision of the communication anomaly, the communication period comprising a transmission period (request period) of the information request signal and a reception period (response period) of the load information signal is repeated for the maximum N times.

Figure 3A:
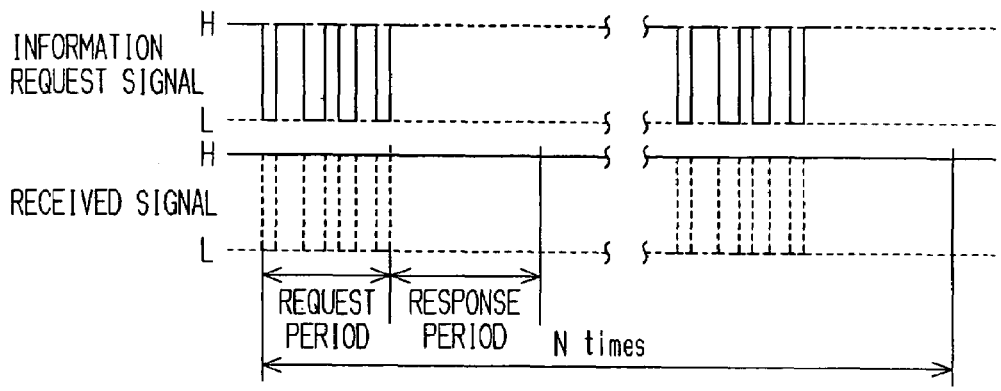
FIGS. 3($a$), 3($b$) and 3($c$) are time charts showing signals passing through a transmission port and first to fourth receiving ports at the time of communication anomaly of the occupant detector of FIG. 2, respectively.
Figure 3B:
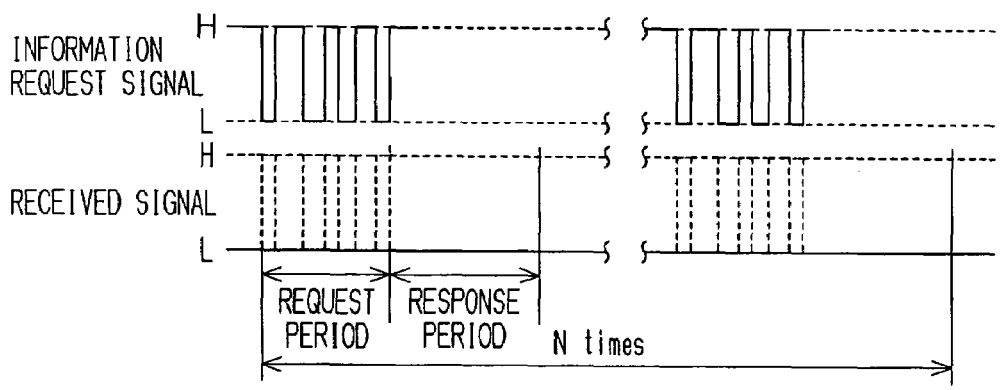

FIG. 3(*a*) shows a relationship between the information request signal at the time of a short-circuit between the signal line 21 and the power supply system and the received signal in the first receiving port 31*a*. The power supply system includes, for example, the positive electrode of the vehicle battery 41 and the power supply line 41*a*. In this case, even if the CPU 31 transmits the information request signal shown in the upper side of FIG. 3(*a*) to the load sensor 14*a*, the information request signal in the signal line 21, because of a short-circuit between the signal line 21 and the power supply system, is forcibly pushed up and fixed to the H level as shown in the lower side of FIG. 3(*a*). Hence, during the transmission period of the information request signal as shown in the upper side of FIG. 3(*a*), the information request signal received at the first receiving port 31*a*, as shown in the lower side of FIG. 3(*a*), is also fixed to the H level through the inner wiring L1. Consequently, the CPU 31 determines that there is a short-circuit between the signal line 21 and the power supply system in a case where the information request signal received at the first receiving port 31*a* is always fixed to the H level as shown in the lower side of FIG. 3(*a*) during the transmission period of the information request signal shown in the upper side of FIG. 3(*a*).

Further, FIG. 3(*b*) shows a relationship between the information request signal at the time of a short-circuit between the signal line 21 and the ground and the received signal in the first receiving port 31*a*. The ground includes, for example, the negative electrode of the vehicle battery 41 and the ground line 41*b*. In this case, even if the CPU 31 transmits the information request signal shown in the upper side of FIG. 3(*b*) to the load sensor 14*a*, the information request signal in the signal line 21, because of a short-circuit between the signal line 21 and the ground, is forcibly pulled down and fixed to the L level as shown in the lower side of FIG. 3(*b*). Hence, during the transmission period of the information request signal as shown in the upper side of FIG. 3(*b*), the information request signal received at the first receiving port 31*a*, as shown in the lower side of FIG. 3(*b*), is also fixed to the L level through the inner wiring L1. Consequently, the CPU 31 determines that there is a short-circuit between the signal line 21 and the ground in a case where the information request signal received at the first receiving port 31*a* is always fixed to the L level as shown in the lower side of FIG. 3(*b*) during the transmission period of the information request signal shown in the upper side of FIG. 3(*b*).

Figure 3C:
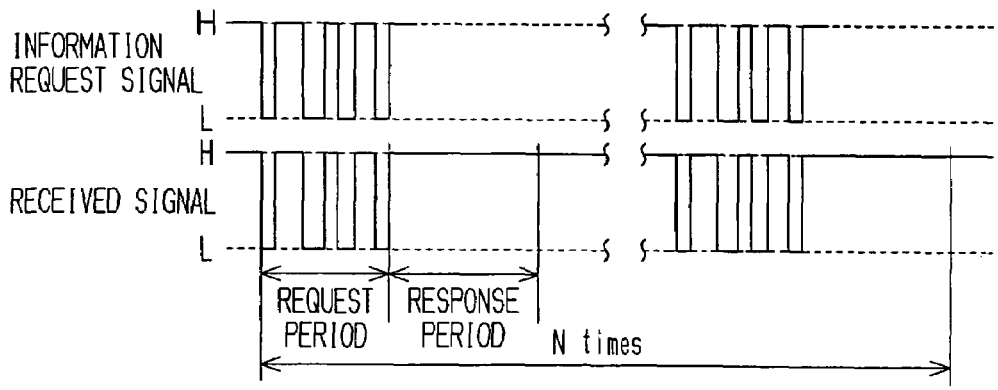

Further, FIG. 3(*c*) shows a relationship between the information request signal at the time of the opening of the signal line 21 or the opening of a feeding ground line to the load sensor 14*a* (signal processor 16) and the received signal in the first receiving port 31*a*. The information request signal during a request period of the upper side of FIG. 3(*c*) transmitted to the load sensor 14*a* by the CPU 31 is the same as the information request signal during a request period of the lower side of FIG. 3(*c*) received at the first receiving port 31*a* by the CPU 31. However, after the request period, in a reception period (response period) in which the CPU 31 receives the load information signal from the load sensor 14*a*, the load information signal received at the receiving port 31*a* by the CPU 31 is fixed to the H level as shown in the response period of the lower side of FIG. 3(*c*). This is because the signal line 21 is opened so that the load sensor 14*a* is disabled to transmit the load information signal to the load sensor 14*a* or the feeding ground line to the load sensor 14 is opened so that the load sensor 14*a* is disable to generate the L level of the load information signal. Hence, the first receiving port 31*a* is fixed to the H level which is waiting for the reception. Consequently, the CPU 31 determines that the signal line 21 is opened or that the feeding ground line to the load sensor 14a is opened in a case where the information request signal shown in the upper side of FIG. 3(c) transmitted to the load sensor 14a during the request period is the same as the information request signal received during a request period of the lower side of FIG. 3(c) at the first receiving port 31a, and moreover, the load information signal received during a response period at the first receiving port 31a is always fixed to the H level as shown during the response period in the lower side of FIG. 3(c).

It is already mentioned that the final decision of each communication anomaly based on the anomaly determination described above is performed by repeating the same determination N times. Needless to mention, the determination of each communication anomaly described above and its final decision are individually performed for each of the load sensors 14a to 14d.

Figure 4:
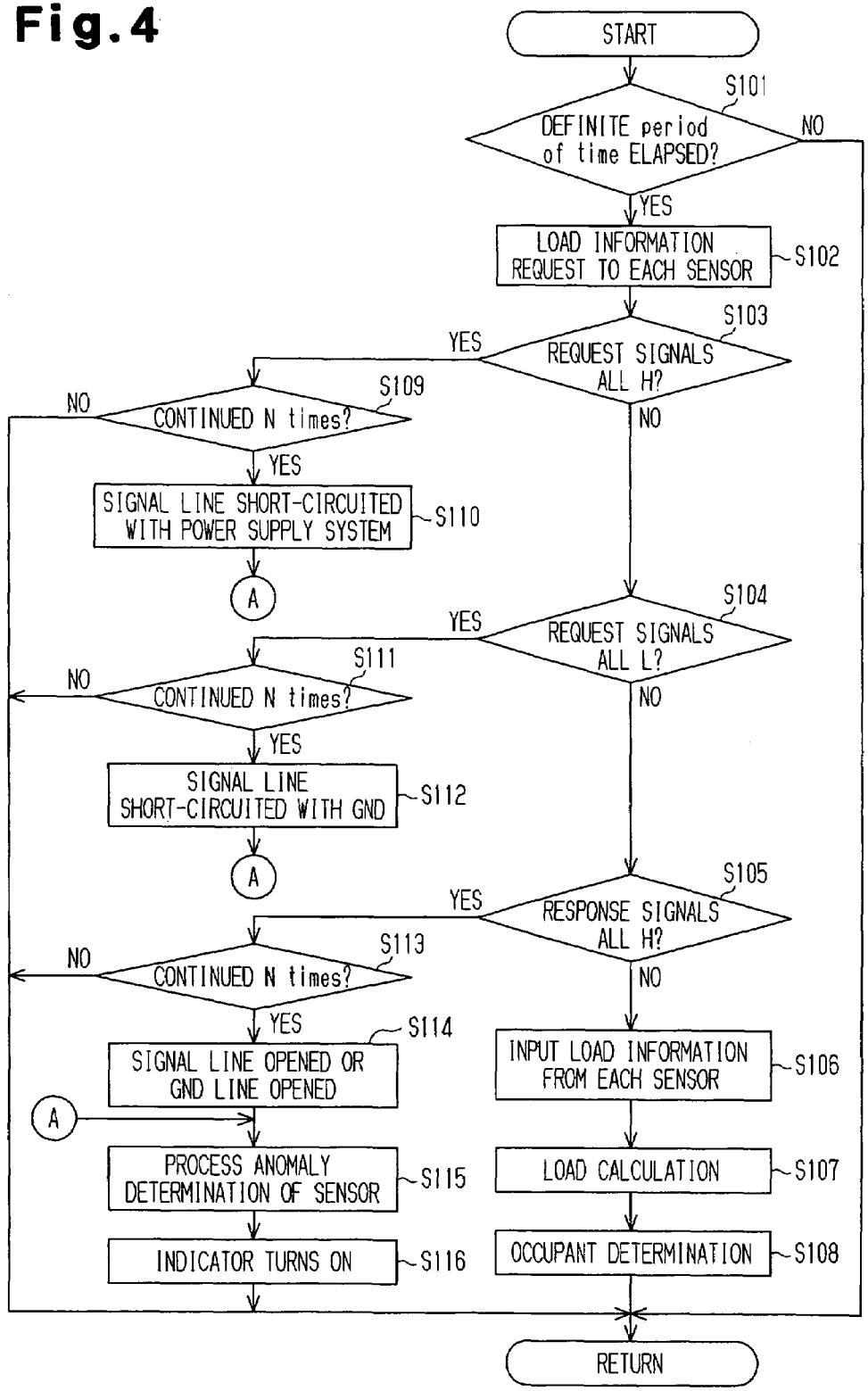
FIG. 4 is a flowchart showing a mode in which the occupant detector of FIG. 2 determines a occupant.

A determination mode mainly comprised of the CPU 31 of the occupant and the like sitting in the seat 1 will be described based on the flowchart of FIG. 4. In this processing, the CPU 31 proceeds to step S102 after the elapse of a fixed period of time by the determination of step S101, and performs the load information request to each of the load sensors 14a to 14d. Specifically, the CPU 31 outputs the information request signal to the signal processor 16 of each of the load sensors 14a to 14d from the transmission port 31e through the inner wirings L1 to L4 and the signal line 21. It is already mentioned that, at this time, each of the signal processors 16, upon reception of the information request signal from the CPU 31, reads the load information stored in the memory of its own signal processor 16, and generates a load information signal in which this read load information is processed according to a predetermined transmission format, and transmits this load information signal to the CPU 31.

Next, at step S103, the CPU 31 determines whether or not any of the information request signals received by itself at the first to fourth receiving ports 31a to 31d is always at the H level throughout the request period. When determining that none of the information request signals is always at the H level throughout the request period, the CPU 31 determines that there exists no short-circuit between the signal lines 21 and the power supply system, and proceeds to step S104.

At step S104, the CPU 31 determines whether or not any of the information request signals received by itself at the first and fourth receiving port 31a to 31d is always at L level throughout the request period. When determining that none of the information request signals is always at the L level throughout the request period, the CPU 31 determines that there exist no short-circuits between the signal lines 21 and the ground, and proceeds to step S105.

At step S105, the CPU 31 determines whether or not any of the load information signals received at the first to fourth receiving ports 31a to 31d in the response period is always at the H level throughout the period. When determining that none of the load information signals is always at the H level throughout the response period, the CPU 31 determines that the signal line 21 and the feeding ground line to the load sensors 14a to 14d are not opened, and proceeds to step S106.

At step S106, the CPU 31 formally acquires the load information included in the load information signals from each of the load sensors 14a to 14d since it is ascertained by steps S103 to S105 that no communication anomaly exists in all the load sensors 14a to 14d. At step S107, the CPU 31 executes a load calculation based on these pieces of the acquired load information. At step S108, the CPU 31 performs an occupant determination based on the calculated load, and temporarily stops the subsequent processing. As the occupant determination, the CPU 31 specifically determines that the seat 1 is in an unoccupied state and that an adult or a child is seated or the like.

On the other hand, at step S103, when the CPU 31 determines that any of the information request signals received at the first to fourth receiving ports 31a to 31d is always at the H level throughout the request period, at step S109, the CPU 31 determines whether or not a state in which the information request signal is always at the H level continues N times. In a case where it continues N times, at step S110, the CPU 31 determines that there are short-circuits between the signal lines 21 of the load sensors 14a to 14d related to the information request signals and the power supply system. That is, at steps S103, S109, and S110, the CPU 31 functions as a power supply system anomaly determination portion. Specifically, at step S110, the CPU 31 sets a power supply system short-circuit determination flag corresponding to the load sensors 14a to 14d (signal lines 21) related to the determination that the short-circuit occurs to "short-circuit exists". That is, the short-circuits between the signal lines 21 and the power supply system are individually registered by the power supply system short-circuit determination flag for each of the load sensors 14a to 14d.

Further, at step S104, when determining that any of the information request signals received at the first to fourth receiving ports 31a to 31d is always at the L level throughout the request period, the CPU 31, at step S111, determines whether or not a state in which the information request signal is always at the L level continues N times. In a case where it continues N times, at step S112, the CPU 31 determines that there are short-circuits between the signal lines 21 of the load sensors 14a to 14d related to the information request signals and the ground. That is, at steps S104, S111, and S112, the CPU 31 functions as a ground anomaly determination portion. Specifically, at step S112, the CPU 31 sets a ground short-circuit determination flag corresponding to the load sensors 14a to 14d (signal lines 21) related to the determination that the short circuit occurs to "short-circuit exists". That is, the short-circuits between the signal lines 21 and the ground are individually registered by the ground short-circuit determination flag for each of the load sensors 14a to 14d.

Further, at step S105, when determining that any of the load information signals received at the first to fourth receiving ports 31a to 31d is always at the H level throughout the response period, the CPU 31, at step S113, determines whether or not a state in which the load information signal is always at the H level continues N times. In a case where it continues N times, at step S114, the CPU 31 determines that the signal lines 21 of the load sensors 14a to 14d related to the load information signals are opened or that the feeding ground line to the load sensors 14a to 14d is opened. That is, at steps S105, S113, and S114, the CPU 31 functions as a signal line/ground line anomaly determination portion. Specifically, the CPU 31 sets the signal line/ground line opening determination flag corresponding to the load sensors 14a to 14d (signal lines 21) related to the opening determination to "opening exists". That is, the opening is individually registered by the signal line/ground line opening determination flag for each of the load sensors 14a to 14d.

When any of the anomaly determination of steps S110, S112, and S114 is performed, the CPU 31 performs the anomaly determination processing of the load sensors 14a to 14d at step S115 (see "A" in FIG. 4 in connection with steps S110 and S112), and proceeds to step S116, and performs a lighting processing of an indicator provided in the passenger compartment. By this processing, the user of the vehicle (driver and the like) is informed of the anomaly of the detector, and urged to take a quick action such as withdrawal to a service station and the like. Then, the CPU 31 temporarily stops the subsequent processing.

Further, at each of steps S109, S111, and S113, in a case where each corresponding state does not continue N times, the CPU 31 temporarily stops the subsequent processing as it is.

With reference to FIG. 2, the CPU 31 outputs the information related to these pieces of the occupant determination information and information related to the communication anomaly to an airbag ECU 43 (as shown in FIG. 2) through the determination output circuit 33. The airbag ECU 43 suitably controls the operation of the airbag based on the acquired occupant determination information and information related to the communication anomaly.

(1) In the present embodiment as described above, depending on whether or not the information request signals received at the first to fourth receiving ports 31a to 31d are always fixed to the H level throughout the request period, the CPU 31 determines the short-circuits between the signal lines 21 and the power supply system.

Further, depending on whether or not the information request signals received at the first to fourth receiving ports 31a to 31d are always fixed to the L level throughout the request period, the CPU 31 determines the short-circuits between the signal lines 21 and the ground.

Further, depending on whether or not the information request signals transmitted to the load sensors 14a to 14d by the CPU 31 is the same as the information request signals received at the first to fourth ports 31a to 31d, and moreover, the information response signals received at the first to fourth receiving ports 31a to 31d are always fixed to the H level, the CPU 31 determines that of the signal lines 21 is opened or that the feeding ground line to the load sensors 14a to 14d is opened.

The CPU 31 performs the determination of each of these communication anomalies in a state capable of identifying that which one of the signal lines 21, each of which is connected one of the load sensors 14a to 14d, is related to the determination. Consequently, the CPU 31 can specify an anomaly region of the signal line 21 and the like or a cause of the anomaly for each of the load sensors 14a to 14d at the time of communication anomaly. Following the communication anomaly, repairing can be performed by focusing on the anomaly region already specified or the cause of the anomaly (the short-circuit between the signal line 21 and the power supply system, the short-circuit between the signal line 21 and the ground, opening of the signal line 21, and like), and therefore, the number of repairing-hours can be reduced.

(2) In the present embodiment, the communication anomaly determination is finally completed by continuously repeating the communication anomaly determination N times at the same event (cause). Hence, at the temporary unstable communications, the CPU 31 can avoid unnecessarily determining communication anomalies (the short-circuit between the signal line 21 and the power supply system, the short-circuit between the signal line 21 and the ground, the opening of the signal line 21, and the like).

Next, a constitution for guaranteeing synchronicity of the load information included in a plurality of load information signals transmitted by a plurality of load sensors will be described at the time of the vehicle determination and the like, when the CPU 31 transmits the information request signals from the transmission port 31e, these transmitted information request signals are simultaneously received by the signal processors 16 of the load sensors 14a to 14d through the diode D, the inner wirings L1 to L4, and the signal lines 21 respectively. Each of the signal processors 16, upon reception of the information request signal from the CPU 31, reads the load information stored in its own memory of the signal processor 16, and generates a load information signal in which this read load information is processed according to the predetermined transmission format, and transmits this generated load information signal to the ECU 20. That is, each of the signal processors 16, upon simultaneous reception of the information request signal from the CPU 31, simultaneously transmits the load information signal including the most recent load information at a point of time when stored in its own memory of the signal processor 16 by all the signal processors 16. In this manner, synchronicity of the load information included in the load information signals transmitted by these load sensors 14a to 14d is guaranteed.

Figure 5:
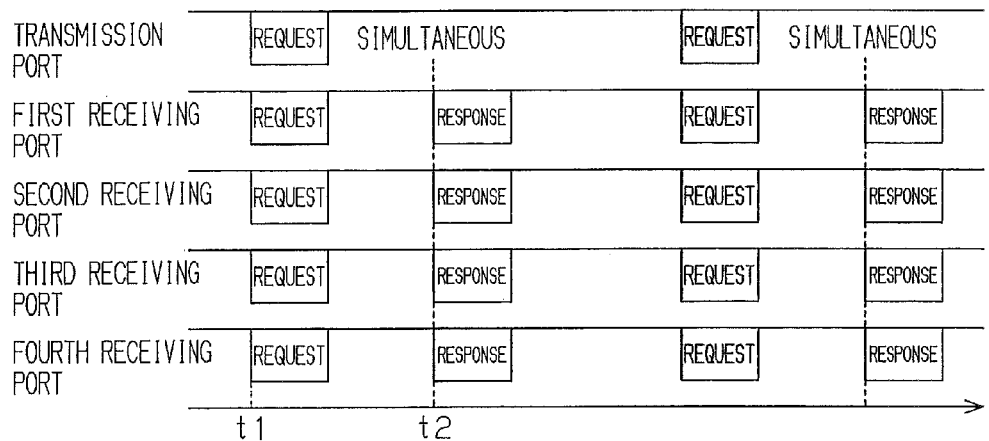
FIG. 5 is a time chart showing the signals in the transmission port and first to fourth receiving ports of the occupant detector of FIG. 2.

FIG. 5 is a time chart showing a relationship between the signals transmitted from the transmission port 31e and the signals received at the first and fourth receiving ports 31a to 31d in the present embodiment. As shown in FIG. 5, when the CPU 31 transmits the information request signals at time t1, these information request signals are simultaneously received (here illustrated as the signals received at the first to fourth receiving ports 31a to 31d) by the signal processors 16 of all the load sensors 14a to 14d of. In this manner, all the load sensors 14a to 14d, based on the predetermined protocol, simultaneously transmit the load information signals at time t2 spaced at definite intervals after receiving the information request signals. The CPU 31 simultaneously receives these load information signals at the first to fourth receiving ports 31a to 31d.

Figure 6A:
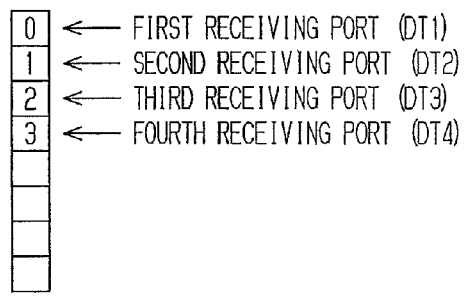
FIG. 6($a$) is a schematic illustration showing a port register A owned by the ECU of FIG. 2, and FIG. 6($b$) is a schematic illustration showing a mode in which the ECU acquires the data of the load sensor.
Figure 6B:
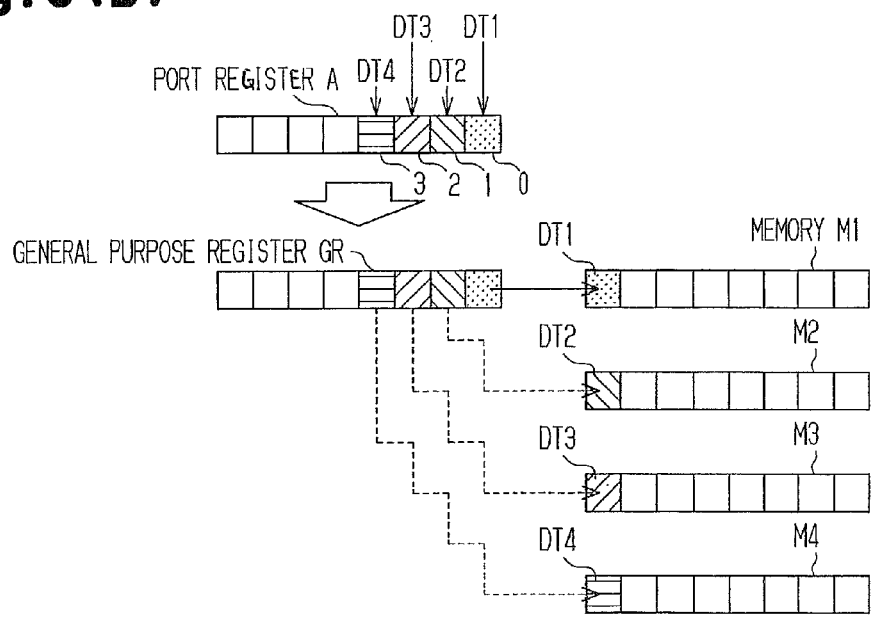

A mode in which the CPU 31 acquires the load information included in the load information signals from the load sensors 14a to 14d will be described on the basis of FIGS. 6 and 7. In the following, a description will be made assuming that the load information (0 or 1) has 8 bits. As shown in FIGS. 6(a) and 6(b), in the present embodiment, the CPU 31 comprises a port register A, a general purpose register GR, a total of four memories M1 to M4 corresponding to each of the load sensors 14a to 14d. The port register A comprises at least a bit area (storage area) allotted to the first to fourth receiving ports 31a to 31d. The general purpose register GR comprises at least the same number of bit areas as the port register A. Each of the memories M1 to M4 corresponds to each of the first to fourth load sensors 14a to 14d, and comprises a bit area of 8 bits. That is, the first to fourth receiving ports 31a to 31d are installed in the port register A of the same register, and by this port register A, the load information included in the load information signals from all the load sensors 14a to 14d is simultaneously acquired. A sensor data DT1 corresponding to the first load sensor 14a is stored in the 0th bit area of the general purpose register GR. Further, a sensor data DT2 corresponding to the second load sensor 14b is stored in the first bit area of the general purpose register GR, a sensor data DT3 corresponding to the third load sensor 14c is stored in the second bit area of the general purpose register GR, and a sensor data DT4 corresponding to the fourth load sensor 14d is stored in the third bit area of the general purpose register GR. As shown in FIG. 6(b), the load information of all the load sensors 14a to 14d acquired simultaneously by the port register A is rewritten into the general purpose register GR timed with reception for each bit, and after that, the information is stored in order into the memories M1 to M4 corresponding to each of the load sensors 14a to 14d. The CPU 31, while shifting in order the sensor data of each of the load sensors 14a to 14d, repeats this processing by the number of bits (8 bits) of the load information, so that the storing of these pieces of the load information into each of the corresponding memories M1 to M4 is completed.

Figure 7:
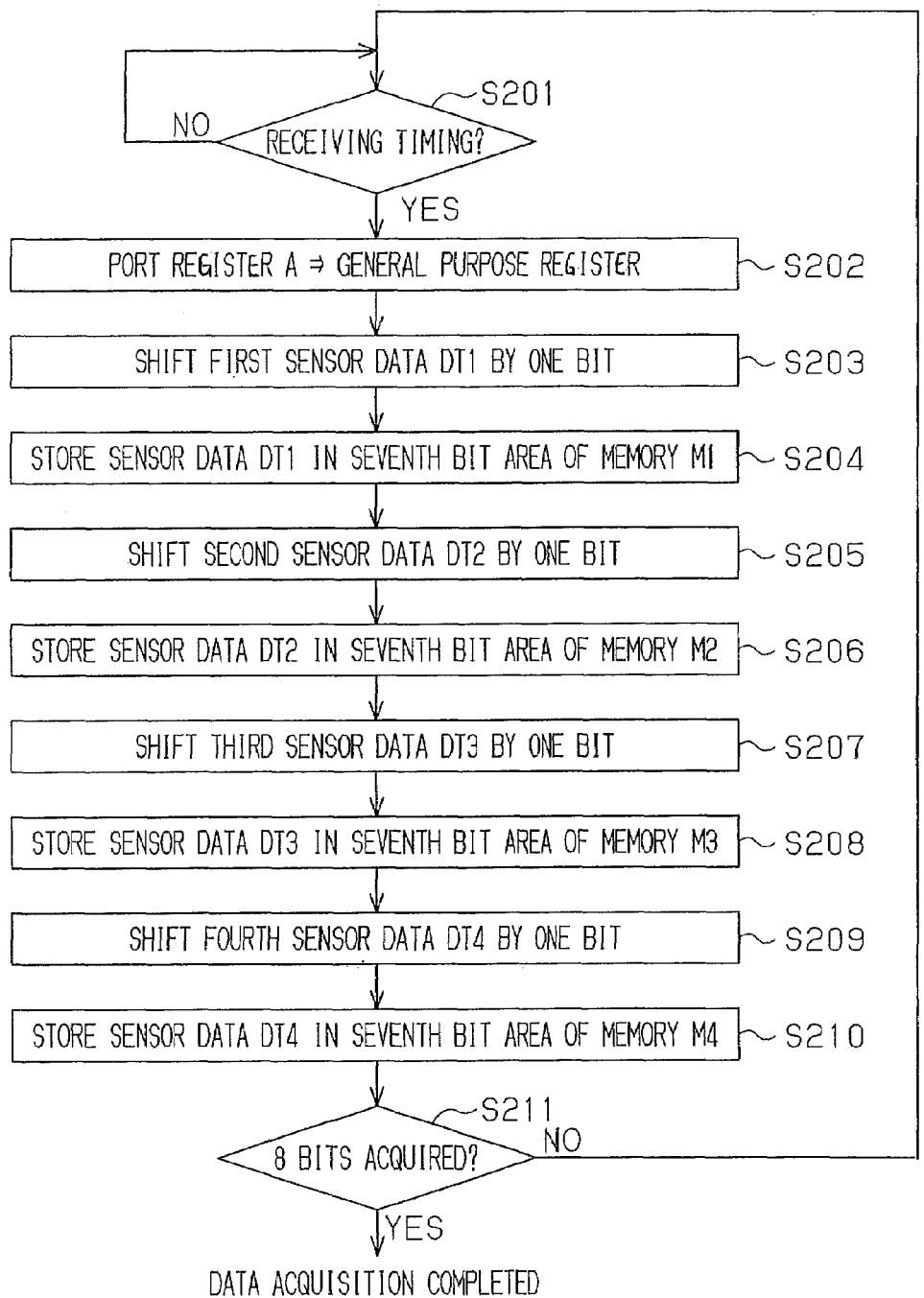
FIG. 7 is a flowchart showing a mode in which the ECU of FIG. 2 acquires the data of the load sensor.

FIG. 7 is a flowchart showing a mode in which the CPU 31 acquires the load information of all the load sensors 14a to 14d. In this processing, the CPU 31 awaits receiving timing by the determination of the step S201 and proceeds to step S202, and rewrites the load information on the first bit of all the load sensors 14a to 14d simultaneously acquired by the port register A into the general purpose register GR. At the stage of the step S202, the sensor data DT1 corresponding to the first load sensor 14a is stored in the 0th bit area of the general purpose register GR. Further, and as discussed above with reference to FIGS. 6(a) and 6(b), the sensor data DT2 corresponding to the second load sensor 14b is stored in the first bit area of the general purpose register GR, the sensor data DT3 corresponding to the third load sensor 14c is stored in the second bit area of the general purpose register GR, and the sensor data DT4 corresponding to the fourth load sensor 14d is stored in the third bit area of the general purpose register GR. The CPU 31 shifts the sensor data DT1 to DT4 stored in the 0th to third bit areas of the general purpose register GR by one bit at step S203. As a result, the sensor data DT1 stored in the 0th bit area of the general purpose register GR is stored in the seventh bit area of the memory M1 corresponding to the first load sensor 14a (step S204). Sensor data DT2 to DT4 stored in the first to third bit areas of the general purpose register GR are stored in the 0th bit to the second bit area of the general purpose register GR. Next, the CPU 31 shifts the sensor data DT2 to DT4 stored in the 0th to second bits areas of the general purpose register GR further by one bit at step S205. As a result, the sensor data DT2 stored in the 0th bit area of the general purpose register GR is stored in the seventh bit area of the memory M2 corresponding to the second load sensor 14b (step S206). Further, the CPU 31 shifts the sensor data DT3 to DT4 stored in the 0th to first bit areas of the general purpose register GR further by one bit at step S207. As a result, the sensor data DT3 stored in the 0th bit area of the general purpose register GR is stored in the seventh bit area of the memory M3 corresponding to the third load sensor 14c (step S208). Further, the CPU 31 shifts the sensor data DT4 stored in the 0th bit area of the general purpose register GR further by one bit at step S209. As a result, the sensor data DT4 stored in the 0th bit area of the general purpose register GR is stored in the seventh bit area of the memory M4 corresponding to the fourth load sensor 14d (step S210).

At step S211, the CPU 31 determines whether or not the 8 bits portion is acquired, and if not acquired, returns to step S201, and repeats the same processing. By the above described procedure, the load information is stored in the memories M1 to M4 corresponding to all the load sensors 14a to 14d, respectively, and the acquisition of the load information by the CPU 31 is completed.

The CPU 31 performs the occupant determination based on those pieces of the acquired information.

(11) As described above, in the present embodiment, the CPU 31 of the ECU 20 simultaneously transmits the information request signals to all the load sensors 14a to 14d by the single transmission port 31e. In this manner, synchronicity of the load information included in the load information signals transmitted by all the load sensors 14a to 14d can be guaranteed. The CPU 31 performs the occupant determination by receiving these load information signals at the first to fourth receiving ports 31a to 31d, so that its detection accuracy can be improved.

Figure 8:
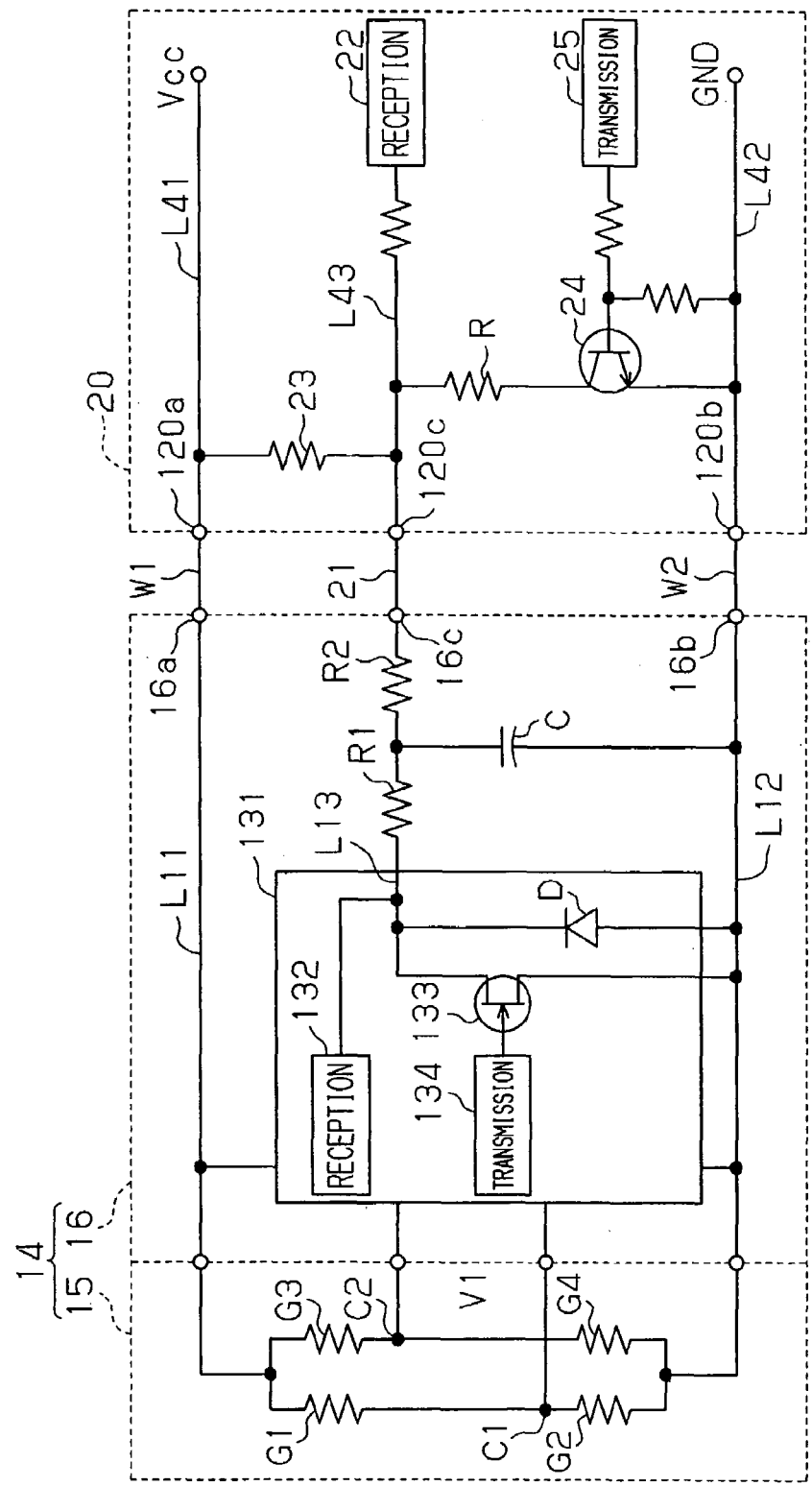
FIG. 8 is a block diagram showing an electrical structure of each load sensor and ECU of the occupant detector of FIG. 2.
Figure 9:
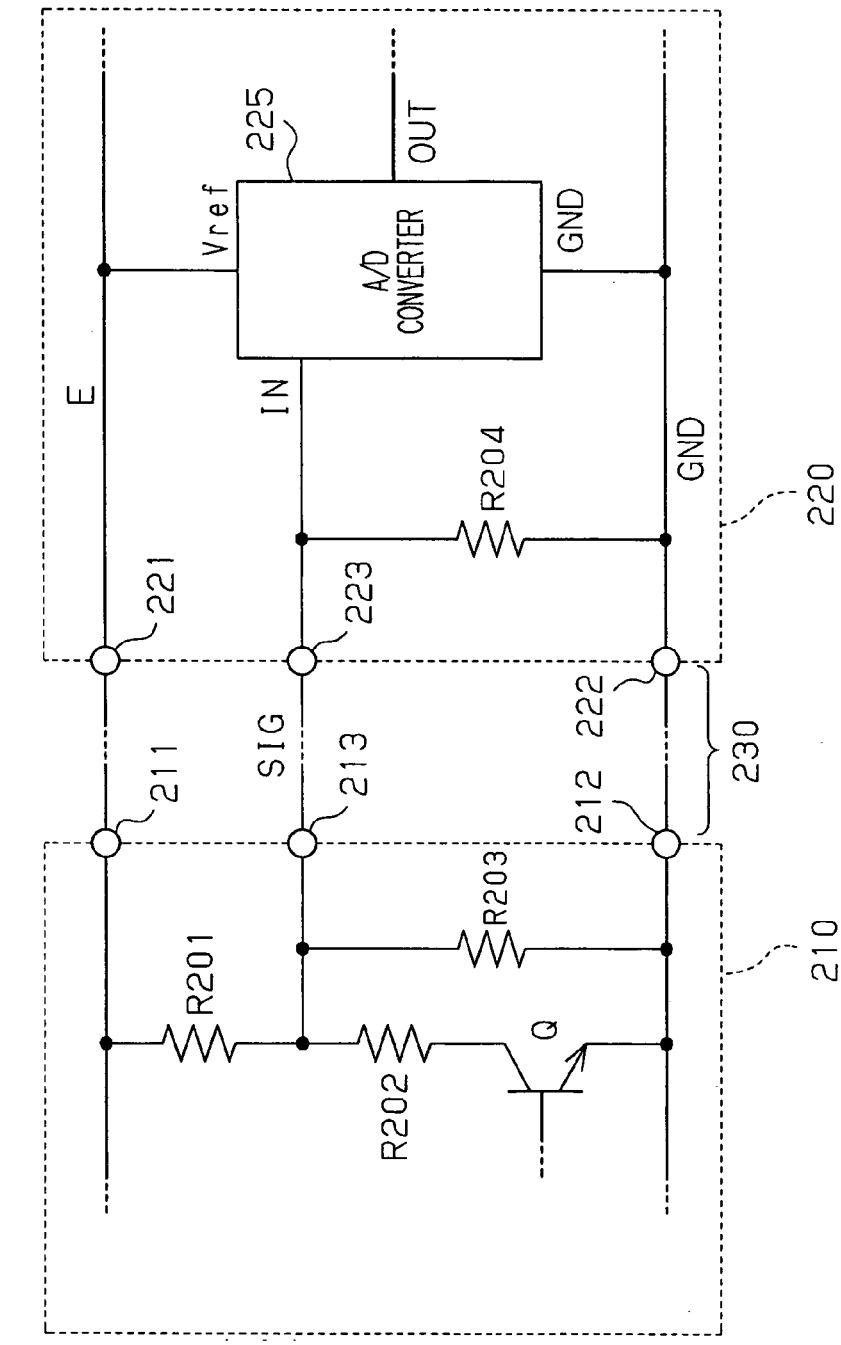
FIG. 9 is a block diagram showing an electrical structure of the occupant detector of the conventional technology.

Next, a constitution for detecting disconnection between the control device and the load sensor without increasing the impedance of a signal system line higher than before will be described. Hereafter, one of the load sensors 14 will be described as representing all the load sensors 14, and reception and transmission of the signal and an electrical constitution related to the supply of electricity between the load sensor 14 and the ECU 20 will be described based on the block diagram of FIG. 8. As shown in FIG. 8, the ECU 20 comprises a first power supply terminal 120a, a second power supply terminal 120b, and a signal terminal 120c for the use of connection with the load sensor 14. These first power supply terminal 120a, second power supply terminal 120b, and signal terminal 120c are made by plating general purpose copper with tin. Further, the ECU 20 comprises a first power supply wiring L41 set to Vcc which is a predetermined level (for example, 5V) to become the H level, and its one end is connected to the first power supply terminal 120a. Further, the ECU 20 comprises a second power supply wiring L42 set to a GND which is a predetermined level (for example, 0V) to become the L level, and its one end is connected to the second power supply terminal 120b. The ECU 20 is supplied with electricity by these first and second power supply wirings L41 and L42.

The signal terminal 120c is connected to a receiving portion 22 of the CPU for inputting a signal from the load sensor 14 through a signal wiring L43. The first power supply wirings L41 and the signal wiring L43 are connected with the one end and the other end of the pull-up resistor 23, respectively. The resistance value of this pull-up resistor 23 is, for example, several kΩ. Further, the signal wiring L43 is connected with a collector as a first terminal of a NPN type transistor 24 as a switching element through a resistor R. The emitter as a second terminal of the transistor 24 is connected with the second power supply wiring L42. The resistance value of this resistor R is set sufficiently smaller (for example, several hundreds Ω) than the resistance value of the pull-up resistor 23. The base as a control terminal of this transistor 24 is connected to the transmission portion 25 of the CPU for outputting a signal to the load sensor 14.

On the other hand, the signal processor 16 of the load sensor 14 comprises a first sensor side power supply terminal 16a, a second sensor side power supply terminal 16b, and a sensor side signal terminal 16c for connection with the ECU 20. These first sensor side power supply terminal 16a, second sensor side power supply terminal 16b, and sensor side signal terminal 16c are also made by plating general purpose copper with tin. The first sensor side power supply terminal 16a is connected to the first power supply terminal 120a through a first power supply line W1, and the second sensor side power supply terminal 16b is connected to the second power supply terminal 120b through a second power supply line W2. The sensor side signal terminal 16c is connected to the signal terminal 120c through the signal line 21. That is, the first and second power supply lines W1 and W2 and the signal line 21 constitute an external wiring for connecting between the signal processor 16 and the ECU 20.

The strain gage 15 comprises four pieces of strain gages G1, G2, G3, and G4. The resistance value of these strain gages G1 to G4 is, for example, several hundred Ω, and changes according to the strain amount of the corresponding strain gages G1 to G4. The strain gage G1 and the strain gage G2 are connected in series. The strain gage G3 and the strain gage G4 are connected in series. These strain gages G1 and G2 connected in series are connected in parallel with the strain gages G3 and G4 connected in series.

A connection portion between both strain gages G1 and G3 is connected to the first sensor side power supply terminal 16a through a first sensor side power supply wiring L11 provided for the signal processor 16. Consequently, the connection portion between both strain gages G1 and G3 and the first sensor side power supply wiring L11 are connected to the first power supply wiring L41 through the first power supply wiring W1, and are set to a high predetermined level Vcc. On the other hand, the connection portion between both strain gages G2 and G4 is connected to the second sensor side power supply terminal 16b through the second sensor side power supply wiring L12 provided for the signal processor 16. Consequently, the connection portion between both strain gages G2 and G4 and the second sensor side power supply wiring L12 are connected to the second power supply wiring L42 through the second power supply wiring W2, and are set to a low predetermined level GND.

Further, a connection portion C1 between the strain gages G1 and G2 and a connection portion C2 between the strain gages G3 and G4 are connected to a signal processing portion 131 provided for the signal processor 16, respectively. The strain gage 15 takes the voltage between these connection portions C1 and C2 as a gage voltage V1 and outputs it to the signal processing portion 131.

The signal processing portion 131 of the signal processor 16 performs the acquisition of the load information and the like based on the gage voltage V1. The signal processing portion 131 is connected to and supplied with electricity by the first sensor side power supply wirings L11 and the second sensor side power supply wiring L12, respectively. That is, the signal processing portion 131 is supplied with electricity by the ECU 20. Further, the receiving portion 132 provided for the signal processing portion 131 is connected to the sensor side signal terminal 16c through the sensor side signal wiring L13 in which the resistors R1 and R2 are installed. The receiving portion 132 is for inputting the signal from ECU 20 to the signal processing portion 131. The connection portion between the resistors R1 and R2 is connected with a second terminal of a capacitor C in which the first end is connected to the second sensor side power supply wiring L12. These resistors R1 and R2 and the capacitor C constitute a filter.

Further, the sensor side signal wiring L13 is connected with a drain as a first sensor side terminal of an N channel type FET 133 functioning as a sensor side switching element. The second sensor side power supply wiring L12 is connected with a source as a second sensor side terminal of the FET 133. A gate as a sensor side control terminal of this FET 133 is connected to a transmission portion 134 of the signal processing portion 131 for outputting a signal to the ECU 20. A diode D for removal of static electricity and noises is connected between the second sensor side power supply wiring L12 of the signal processor 16 and the sensor side signal wiring L13 (between a drain and a source of the FET 133).

In the present embodiment, the first power supply system line is formed by the first power supply wiring L41, the first power supply line W1, and the first sensor side power supply wiring L11. The second power supply wiring L42, the second power supply line W2, and the second sensor side power supply wiring L12 form the second power supply system line. Further, the signal wiring L43, the signal line 21, and the sensor side signal wiring L13 form the signal line system.

In the above described circuit constitution, a description will be made on the case where the ECU 20 transmits a signal (information request signal) with respect to the normal operation relating to the transmission and reception of the signals at this time, the signal processor 16 maintains the FET 133 in an off-state because of waiting for the signal from the ECU 20. When the ECU 20 inputs the information request signal to the base of the transistor 24 from the transmission portion 25, the transistor 24 turns on and off according to the level (H level/L level) of the information request signal. In the on-state of the transistor 24, the current flows into the pull-up resistor 23, the resistor R and the transistor 24, so that the pull-up resistor 23 generates a predominant voltage drop. Hence, the signal wiring L43 comes to the L level. The signal line 21 connected to this signal wiring L43 and the sensor side signal wiring L13 also come to the L level. On the other hand, in the off-state of the transistor 24, the pull-up resistor 23 does not generate the voltage drop. Hence, the signal wiring L43 comes to the H level of the same potential as the first power supply wiring L41. The signal line 21 connected to this signal wiring L43 and the sensor side signal wiring L13 also come to the H level. In this manner, the levels of the signal wiring L43, the signal line 21, and the sensor side signal wiring L13 change level according to the level of the information request signal, so that the information request signal is transmitted from the ECU 20 to the receiving portion 132 of the load sensor 14 (signal processing portion 131) through the sensor side signal wiring L13.

Next, a description will be made on the case where the load sensor 14 (signal processing portion 131) transmits a signal (load information signal) with respect to the normal operation relating to the transmission and reception of the signals at this time, the ECU 20 maintains the transistor 24 in an off-state because of waiting for the signal from the load sensor 14. When the load sensor 14 inputs the load information signal to the gate of the FET 133 from the transmission portion 134, the FET 133 turns on and off according to the level (H level/L level) of the load information signal. In the on-state of the FET 133, the current flows into the pull-up resistor 23, signal wiring L43, signal line 21, sensor side signal wiring L13 and FET 133, so that the pull-up resistor 23 generates a voltage drop. Hence, the signal wiring L43 comes to the L level. On the other hand, in the off-state of the FET 133, the pull-up resistor 23 does not generate the voltage drop. Hence, the signal wiring L43 comes to the H level of the same potential as the first power supply wiring L41. In this manner, the level of the signal wiring L43 change level according to the level of the load information signal, so that the load request signal is transmitted from the load sensor 14 to the receiving portion 22 of the ECU 20 through the signal wiring L43.

Assume that, from among the first power supply line W1 between the first sensor side power supply terminal 16a and the first power supply terminal 120a, the second power supply line W2 between the second sensor side power supply terminal 16b and the second power supply terminal 120b, and the signal line 21 between the sensor side signal terminal 16c and the signal terminal 120c, at least one line is disconnected at this time, in the ECU 20, regardless of the level of the load information signal at the waiting time for receiving the load information signal from the load sensor 14, there is no voltage drop generated in the pull-up resistor 23. Therefore, in the ECU 20, the level of the signal wiring L43 is fixed to the H level. Hence, the signal received by the receiving portion 22 of the ECU 20 through the signal wiring L43 is also fixed to the H level. Consequently, the ECU 20, based on the level (fixed to the H level) of the signal wiring L43 in a state of waiting for reception, instantaneously detects the occurrence of disconnections at the first power supply line W1, the second power supply line W2 or the signal line 21.

(21) As described above, in the present embodiment, when at least one line from among the first power supply line W1, the second power supply line W2, and the signal line 21 is disconnected, the ECU 20 does not allow the pull-up resistor 23 to generate the voltage drop at the time of waiting for the reception of the load information signal from the load sensor 14 regardless of the level of the load information signal. Hence, in the ECU 20, the level of the signal wiring L43 is fixed to the H level. Consequently, the ECU 20, based on the level (fixed to the H level) of the signal wiring L43 in a state of waiting for reception of the signal, can detect disconnection of the first power supply line W1 and the second power supply line W2 or the signal line 21.

In the ECU 20, a pull-down resistor of a high resistance value (for example, 100 kΩ or more) is not installed but the pull-up resistor 23 of a low resistance value (several kΩ) is installed. Hence, it is possible to hold down the impedance of the signal system line (signal line 21 and the like).

(22) In the present embodiment, disconnection of the first power supply line W1 and the second power supply line W2 or the signal line 21 is instantaneously detected, so that early countermeasures can be taken for the failure.

(23) In the present embodiment, in an on-state of the FET 133, a large current to the extent of several mA (=5V/several kΩ) is let flow into the signal line 21 and the like by the pull-up resistor 23 of a low resistance value. Hence, the same large current is let flow into the signal terminal 120c and the sensor side signal terminal 16c. By this large current, the oxide film formed in these signal terminal 120c and the sensor side signal terminal 16c can be crushed.

The present embodiment may be changed as follows.

In the above described embodiment, the number the load sensors 14 is not limited to four, but to take the advantages of (1), (2), (21), (22), and (23), it may be any natural number (one or more). Further, to take the advantage of (11), the number the load sensors 14 may be any number greater than one.

In the above described embodiment, the strain gage 15 may be adhered to the lower surface of the bending portion 13a.

In the above described embodiment, the constitution of the sensor unit 6 is one example, and any other constitutions may be adopted as long as the sensor unit 6 can detect a load applied to the seat 1.

In the above described embodiment, while the same resistors are installed in the first to fourth receiving ports 31a to 31d, the resistors may be individually installed. In this case, if general purpose resistors are used, the costs are reduced.

In the above described embodiment, an N channel transistor (MOSFET, Junction FET, and the like) may be adopted as the transistor 24. On the other hand, though no particular mention has been made in the above embodiment, the FET 133 also can adopt the MOSFET, Junction FET and the like. Alternatively, in place of the FET 133, a NPN type transistor may be adopted.

In the above described embodiment, the diodes D may be omitted.

In the above described embodiment, a diode for removal of static electricity and noises may be connected between the first sensor side power supply wiring L11 of the signal processor 16 and the sensor side signal wiring L13. Even if changed in this manner, at the time of disconnection of the first power supply line W1, the second power supply line W2 or the signal line 21, without being affected by the sneak signal of the inner circuit of the load sensor 14 (signal processor 16), the signal received by the receiving portion 22 of the ECU 20 is fixed to the H level.

In the above described embodiment, the first and second power supply lines W1 and W2 and the signal lines 21 may be bundled together so as to constitute a harness.

In the above described embodiment, the load sensor 14 may acquire the presence or absence of an abnormal load (collision load) as collision information. In this case, the load sensor 14 may transit a collision information signal (diagnosis signal) based on this collision information together with the transmission of the load information signal to the ECU 20.

In the above described embodiment, the sensor connected to the ECU 20 is not limited to the load sensor. In brief, the sensor may be a sensor capable of transmitting suitable information response signals by receiving the information request signals from the ECU 20.

In the above described embodiment, the communication system constituted by the information request portion and the information response portion may be, for example, a communication system constituted by a host computer (server and the like) and a terminal (personal computer and the like).

The invention claimed is:

1. An occupant detector, comprising:
    at least one load sensor for acquiring load information according to a load applied to a seat and
    a control device connected to the load sensor in such a manner that bidirectional digital communications are possible through a signal system line,
    wherein, when the control device transmits an information request signal to the load sensor, the load sensor receives the information request signal, and the load sensor transmits a load information signal including the load information in response to the received information request signal, and the control device receives this load information signal and performs an occupant determination,
    the occupant detector comprising:
    the control device and
    first and second power supply system lines for supplying electricity to the load sensor through the control device, and the potential of the first power supply system line is higher than the potential of the second power supply system line,
    wherein the control device comprises a switching element and a pull-up resistor, and wherein the switching element comprises a first terminal connected to the signal system line, a second terminal connected to the second power supply system line, and a control terminal for inputting the information request signal, and wherein the pull-up resistor has one end connected to the first power supply system line and another end connected to the signal system line, and
    wherein the load sensor comprises a switching element comprising a first terminal connected to the signal system line, a second terminal connected to the second power supply system line, and a sensor side control terminal for inputting the load information signal.

2. The occupant detector according to claim 1, wherein the load sensor comprises a strain gage for generating a gage voltage according to a strain amount according to a load applied to the seat, and acquires the load information based on the gage voltage.

* * * * *